United States Patent

[11] 3,604,574

| [72] | Inventor | John Daniel Leitch |
| | | Toronto, Ontario, Canada |
| [21] | Appl. No. | 839,354 |
| [22] | Filed | July 7, 1969 |
| [45] | Patented | Sept. 14, 1971 |
| [73] | Assignee | Upper Lakes Shipping Ltd. |
| | | Toronto, Ontario, Canada |

[54] APPARATUS FOR UNLOADING BULK MATERIAL FROM A STORAGE ENCLOSURE
2 Claims, 3 Drawing Figs.

[52] U.S. Cl. .................................................... 214/15 E,
  214/10, 214/16 R
[51] Int. Cl. ...................................................... B63b 27/22
[50] Field of Search ........................................... 198/36;
  214/10, 15 D, 15 E, 16, 17.82, 15, 14

[56] References Cited
UNITED STATES PATENTS

| 1,829,923 | 11/1931 | Cole .............................. | 214/10 X |
| 2,579,153 | 12/1951 | Meissner ........................ | 214/16 |
| 3,148,784 | 9/1964 | Pickrell, Jr. .................... | 214/15 (E) |
| 3,384,248 | 5/1968 | Leitch et al. ................... | 214/15 (E) X |
| 3,487,910 | 1/1970 | Strocker et al. ............... | 198/36 |
| 2,529,263 | 11/1950 | Reese ............................ | 214/16 |

FOREIGN PATENTS

| 1,059,607 | 2/1967 | Great Britain ................ | 214/10 |

*Primary Examiner*—Gerald M. Forlenza
*Assistant Examiner*—Frank E. Werner
*Attorney*—Douglas S. Johnson ABSTRACT: A wheeled reclaimer for dislodging material in the hold of a ship consisting of a frame which carries chain driven horizontally disposed spaced apart bars, the latter having outwardly disposed prongs which dig into the material on activation of the chains.

APPARATUS FOR UNLOADING BULK MATERIAL FROM A STORAGE ENCLOSURE

FIELD OF THE INVENTION

This invention relates to a system and apparatus for unloading bulk material from a storage enclosure and has particular relation to the apparatus for unloading the hold of a cargo vessel containing granular material, such as iron ore pellets, iron ore concentrates, crushed stone, gypsum, phosphates, pyrites, potash, coal or grain.

DESCRIPTION OF PRIOR ART

In U.S. Pat. No. 3,384,248 there is described a system and apparatus for unloading bulk material from a cargo vessel wherein the hold containing the material has a centrally located lengthwise discharge conveyor under the hold, the material being fed progressively through a series of gates in the hold surface disposed above the conveyor. After gravity unloading has effected the removal of all possible material, the reclaimer apparatus, which travels on rails, is then advanced into the hold with the object of dislodging and discharging the material which adheres to the side of the hold.

The reclaimer apparatus disclosed in U.S. Pat. No. 3,384,248 includes a laterally oriented screw conveyor in the hold on each side of the lengthwise conveyor. The screw conveyors are fed by material which is dislodged from the sides of the hold by a pair of dislodging mechanisms each consisting essentially of a series of harrows carried on a frame, with provision to oscillate the harrows laterally in relation to the hold against the material remaining in each side of the hold. The movement towards and away from the material effects dislodgement of the latter so that it runs downwards to the screw conveyors and is then carried towards the discharge belt conveyor by the screw conveyors.

The reclaimer disclosed in U.S. Pat. No. 3,384,248 is stored at one end of the hold and is provided with a cover to protect it from damage which could result during the loading of material into the hold. As explained above, the reclaimer has a movement along the hold with respect to the sides and bottom of the hold, but the harrow-type dislodging mechanism has a lateral reciprocating movement and it will be appreciated that before the harrows can operate, there must be sufficient space clear of material and forward of the harrows into which they can move before dislodgment of material can be accomplished effectively. Accordingly, when the reclaimer is stored, the hold is not loaded up to the reclaimer and this means a loss of storage space. It will be understood that the preferred movement of the dislodging mechanism should be in a forward direction, along with the reclaimer movement, rather than a lateral direction.

Accordingly, it is an object of the invention to provide a dislodging mechanism which can be advanced from its position in storage to immediately operate to dislodge the material downwards the screw conveyors.

BRIEF DESCRIPTION OF THE DRAWINGS

The invention will now be described in relation to the accompanying drawings, in which.

DESCRIPTION OF THE PREFERRED EMBODIMENTS

Figure 1:
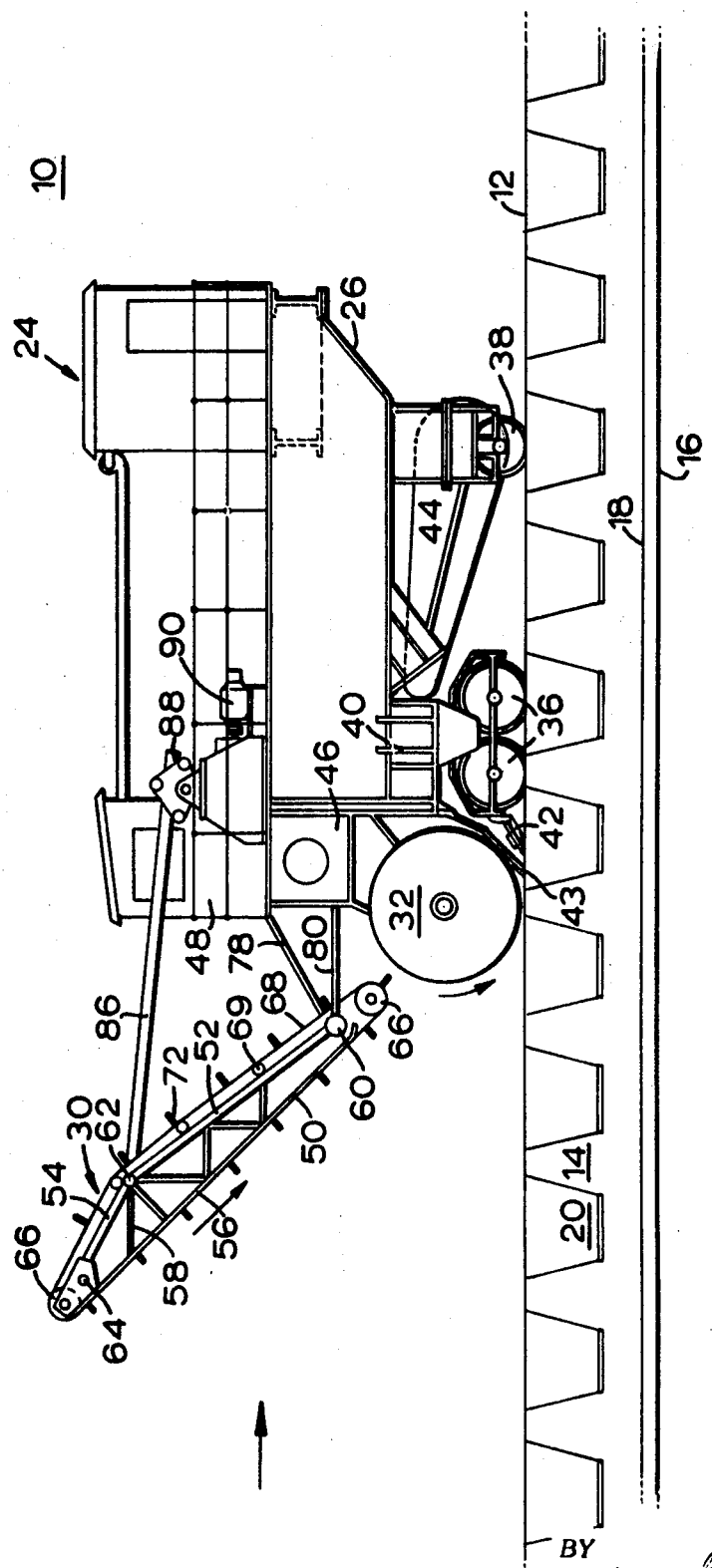
FIG. 1 is a vertical section of a reclaimer and a pivotably attached dislodging mechanism carried to the front thereof, constructed according to the invention.

The embodiments of the invention shown in the drawings are particularly adapted for unloading bulk material cargo from the single hold of a cargo vessel of the type which operates on inland waters, but it should be apparent that the invention hereinafter described has application in the unloading of bulk material from other types of storage enclosures as well.

Referring now more particularly to FIG. 1, the hold 10 of the cargo vessel is defined along its lower surface by a floor 12 which supports the bulk material withing the hold 10 and which is arranged to define a channel 14 positioned generally centrally of the vessel and extending longitudinally from one end of the hold to the other.

The base 16 of the channel 14 constitutes the lowest point of the hold so that the bulk material flows by gravity into the channel 14. A conveyor 18 is supported adjacent the base 16 of the channel 14 and is adapted to transport material lengthwise of the hold 10 to an apparatus (not shown) positioned at the one end of the vessel which raises it to deck level for eventual delivery ashore.

Bulk material flows into channel 14 and on to the conveyor 18 through chutes 20 which extend downwardly into channel 14 from the level of the floor 12 into vertically spaced relation to the conveyor 18. Each chute 20 is provided with a gate 22 at its lower end which controls the flow of material on to the conveyor 18 as described more particularly in U.S. Pat. No. 3,384,248.

Figure 2:
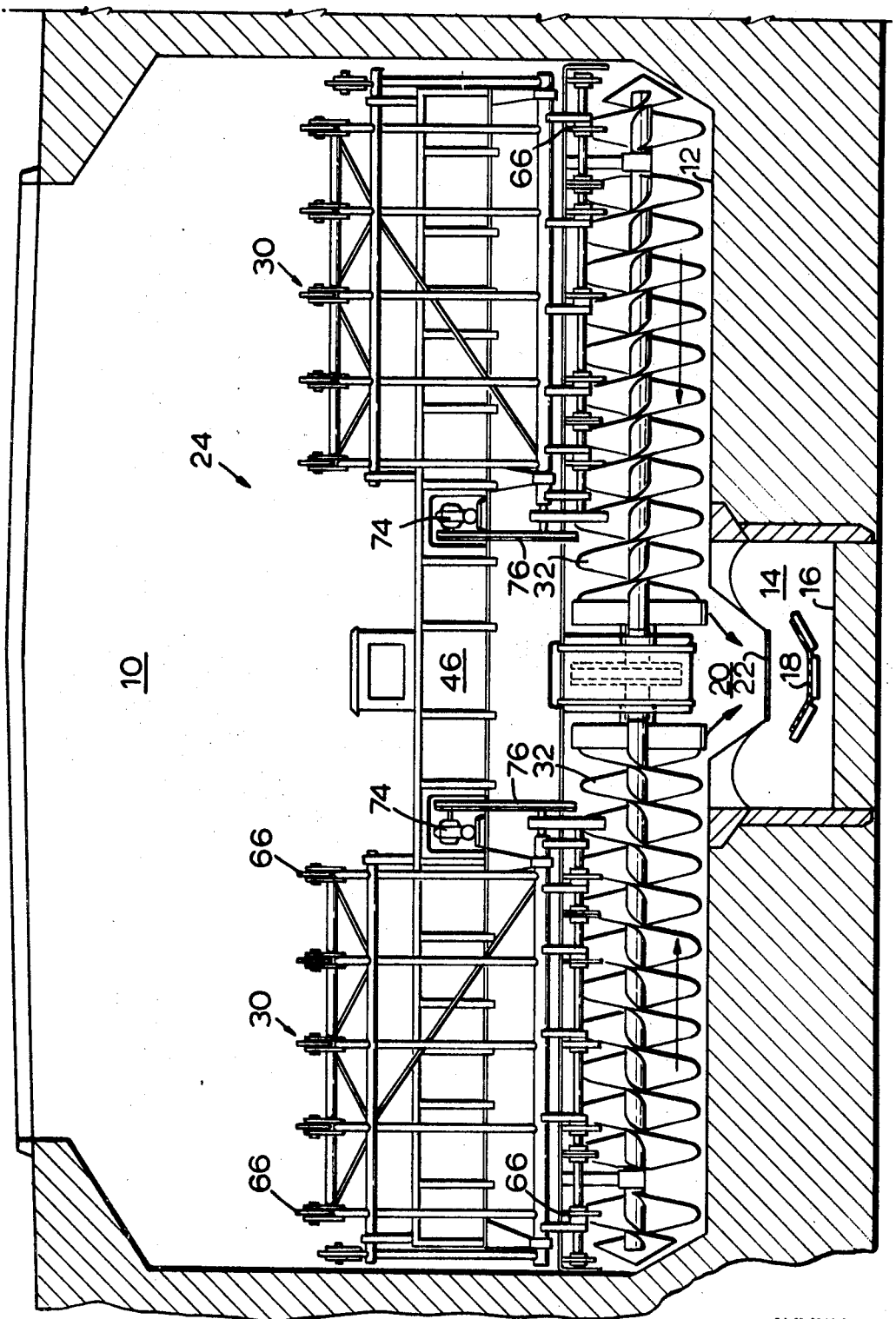
FIG. 2 is a view taken in the direction of arrow "A" of FIG. 1.

After gravity unloading has effected the removal of all possible material from the hold 10, quantities of additional material will generally remain packed in piles along the areas flanking and above the channel 14 in 10. In order to remove this material, a travelling reclaimer, generally denoted by the numeral 24, is provided (see FIG. 2). In the principal embodiment this machine is permanently installed in the hold 10 at the one end of the vessel when the hold 10 is either completely filled or emptied and the cargo vessel is underway but is movable longitudinally in the hold 10 to dislodge material from the bottom and sides thereof while at the same time controlling the flow of material into the channel 14 and on to the conveyor 18.

The reclaimer 24 comprises a wheeled undercarriage or frame 26 which is guided for movement above the conveyor 18 on tracks (not shown) defined by the floor 12 of the hold 10. The undercarriage 26 supports a pair of rakes 30 which are adapted to engage the material lining the walls of the hold 10 to dislodge this material causing it to flow to the floor 12 of the hold 10. A pair of rotating screw conveyors 32 supported by the undercarriage 26 of the reclaimer 24 adjacent to the floor 12 move the dislodged material through the chutes on the conveyor 18.

The frame 26 of the reclaimer 24 is formed of heavy beams or plate work to enable it to support the weight of the rakes 30 and to withstand the forces to which they are subjected during operation.

the frame 26 rests on two pairs of forwardmost wheels 36 and a rearward pair 38, the forwardmost wheels 36 being attached to the frame 26 by heavy brackets 40 enclosed by a plow-type shield 42 which protects the wheel bearings from contact with the material being unloaded and which also serves to divert material away from the wheels as the reclaimer 24 advances through the hold 10. The frame 26 also supports forward of the shield 42 a further scraper device 43 which cleans the floor 12 of the hold 10 behind the screw conveyors 32 as the reclaimer 24 advances.

The reclaimer 24 is propelled through the rearmost wheels 38 by a drive 44. The reclaimer 24 includes a transverse section 46 which overhangs the channel 14 and from which the rotating screw conveyors 32 are suspended. A superstructure 48 is supported on the transverse section 46.

Figure 3:
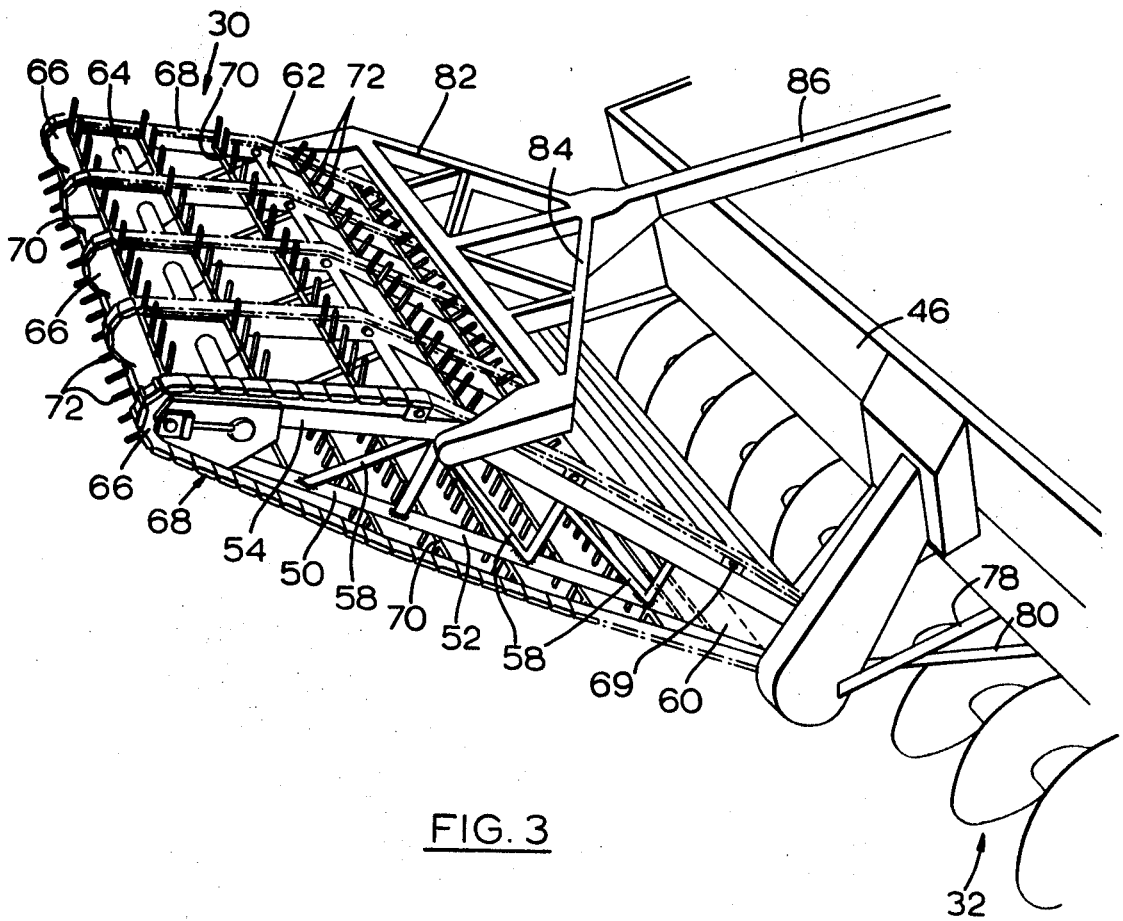
FIG. 3 is a perspective view of the dislodging mechanism viewed from the upper deck of the ship looking in a direction downward into the hold towards the reclaimer.

As illustrated in the drawings, and more particularly FIG. 3, each rake 30 comprises a fixed assembly of sections forming a frame, each generally denoted by the numeral 50, each being substantially triangular in cross section and formed of bars 52, 54 and 56; the frames 50 are strengthened and connected together by struts 58 and heavier bars 60, 62 and 64. The opposed ends of each frame 50 have sprocket wheels 66 enclosed by an individual chain drive 68 which is kept clear of the frame 50 by idler wheels 69. Spaced-apart crossmembers 70 connect the chain drives 68, each member 70 having a series of outwardly disposed spaced-apart prongs 72. The chain drive 68 is driven by a motor 74 through suitable linkage 76.

The opposed ends of the crossbar 60 are pivotably secured to a pair of beams 78 and 80, the opposite ends of which are secured to the transverse section 46 of the reclaimer 24.

The opposed ends of the crossbar 62 are secured to the projecting arms 82 and 84 of a beam 86, the opposed end of which forms a pawl and ratchet arrangement 88 supported on the superstructure 48 and driven by a motor 90.

The rakes 30 are intended to disturb the material in the hold 10 after or before gravity unloading has been terminated so as to cause the material to move towards the screw conveyors 32. To permit this function, the reclaimer 24 is propelled forwardly through the rearmost wheels 38 by the drive 44 with the result that the rakes 30 come into contact with the material. At the same time the linked chain drives 68 are operated by the motor 74 and the outwardly disposed prongs 72 enter the surface of the suspended materials, thus causing the requisite disturbance.

The rakes 30 operate most effectively when the material being unloaded flows in a uniform rate from its piled disposition in the hold towards the screw conveyors 32. This will depend in part on the condition of the material, and the angle of the rakes 30 may be adjusted between a generally vertical position and one which is inclined approximately 45° to the vertical through operation of the pawl and ratchet arrangement 88 at the end of the beam 86.

I claim:

1. In a cargo vessel, apparatus for unloading bulk material from a cargo hold thereof having sidewalls, a floor, a longitudinally extending channel beneath said floor, and a longitudinally extending conveyor within said channel; a reclaimer for moving material across said floor into said channel and on to said conveyor, said reclaimer comprising a wheeled undercarriage having a frame adapted to be moved longitudinally of the enclosure, rake means mounted on said wheeled undercarriage for dislodging material piled within said enclosure, said rake means extending forwardly of said undercarriage, said rake means including a rake frame, a plurality of spaced-apart movable bars on said rake frame, said bars being substantially normal with respect to said sidewalls, said bars having a plurality of prongs extending outwards with respect to said frame, and means for propelling said bars on said rake frame; said rake means being spaced forwardly from said undercarriage by substantially rigid upper and lower beam means secured to said rake frame and to said undercarriage frame; said rake means being pivotably mounted on said lower beam means, and said upper beam means being movable forwardly and backwardly with respect to the direction of movement of said wheeled undercarriage.

2. A reclaimer in accordance with claim 1, wherein said means for propelling said bars include a plurality of chain drives secured to said bars, said chain drives being substantially normal to said bars.